United States Patent [19]

Olson et al.

[11] Patent Number: 5,511,830
[45] Date of Patent: Apr. 30, 1996

[54] QUICK CONNECT TUBE COUPLINGS

[75] Inventors: Darwin C. Olson, Franklin, Tenn.;
John S. Hyska, Vinita, Okla.

[73] Assignee: Dana Corporation, Toledo, Ohio

[21] Appl. No.: 308,906

[22] Filed: Sep. 20, 1994

[51] Int. Cl.⁶ ................................................ F16L 33/00
[52] U.S. Cl. .................... 285/243; 285/255; 285/323; 285/331; 285/347
[58] Field of Search .................... 285/322, 323, 285/347, 331, 234, 239, 240, 241, 242, 246, 243, 255, 101, 259; 138/89, 90, 89.3, 89.4, 96 R

[56] References Cited

U.S. PATENT DOCUMENTS

| | | |
|---|---|---|
| 3,003,792 | 10/1961 | Gilmour ................................ 285/242 |
| 3,679,239 | 7/1972 | Schmitt ................................ 285/331 |
| 3,909,046 | 9/1975 | Legris . |
| 4,431,216 | 2/1984 | Legris ................................ 285/323 |
| 4,445,714 | 5/1984 | Kisiel, III ........................... 285/323 |
| 4,685,706 | 8/1987 | Kowal et al. . |
| 4,705,304 | 11/1987 | Matsuda et al. ..................... 285/243 |
| 4,712,813 | 12/1987 | Passerell et al. ................... 285/323 |
| 5,042,844 | 8/1991 | Iida et al. . |
| 5,085,472 | 2/1992 | Guest . |
| 5,348,354 | 9/1994 | Badoureaux ........................ 285/331 |

FOREIGN PATENT DOCUMENTS 2080467  2/1982  United Kingdom .................. 285/323

*Primary Examiner*—Dave W. Arola
*Assistant Examiner*—Heather Chun Shackelford
*Attorney, Agent, or Firm*—Millen, White, Zelano, & Branigan

[57] ABSTRACT

A quick connect tube coupling is configured for use with unstepped bores in conventional fittings, valves, manifolds and similar devices. The coupling includes a tubular tube support which has structure thereon for positively coupling with a brass sleeve which is utilized to retain the coupling in the bore. The tubular tube support further includes a stepped portion which locates a primary O-ring seal for sealing directly with a tube connected by the coupling and a secondary O-ring seal which seals with the wall of the bore. In accordance with a preferred embodiment, the tube support is molded of plastic and is polygonal in cross-section.

8 Claims, 2 Drawing Sheets

QUICK CONNECT TUBE COUPLINGS

FIELD OF THE INVENTION

This invention relates to quick connect tube couplings and more particularly to improvements in structures for such couplings.

BACKGROUND ART

Quick-connect tubes are used to connect flexible fluid conduits in many different fluid power systems such as, for example, pressurized air systems for vehicle air brakes and air conditioning systems. The tubes require a coupling to connect the end of the tube to a body which may be a conventional fitting, valve, manifold, or similar device for transmitting and receiving pressurized air. Connecting a tube to a body, or removing the tube from a body, can be a time consuming and expensive task which is frequently performed in the field where specialized tools may not be readily available.

There are a wide variety of "push-to-connect" type couplings which permit a tube to be quickly and easily connected to a body without the use of tools. With these couplings, the tube is connected by simply press fitting the coupling in a bore within the body and then inserting the leading end of the tube into the coupling. Typically, the coupling contains a plurality of components which releasably retain the tube therein.

In order for presently used couplings to perform effectively, the bores in the bodies to which the tubes are connected are stepped and formed with relatively tight tolerances. In order to reduce manufacturing expenses and lessen the occurrences of coupling malfunctions, it is preferable to have unstepped bores which can be made with higher tolerances. Since currently available couplings require stepped bores, there is a need for new quick connect tube couplings which function effectively with an unstepped bore configuration.

SUMMARY OF THE INVENTION

In view of the aforementioned considerations, it is a feature of the present invention to provide new and improved quick connect couplings which are readily usable to connect tubes and plugs in unstepped bores.

In view of this feature and other features, the present invention is directed to couplings for connecting tubes or plugs to unstepped circular bores within a body wherein the tubes or plugs each have selected inner and outer diameters. The couplings comprise a tube support having an inner, axially extending tube insertion portion with an outer diameter substantially equal to the inner diameters of the tube and plug. The tube support also has a radially extending portion with an axially facing end and a first latching structure surface. A sleeve abuts the axially facing surface of the tube support and includes a second latching structure which couples with the first latching structure. A collet having a radial flange portion and a tube gripping portion with an inner diameter greater than the outer diameter of the insertion portion of the tube fits within the sleeve. The collet has a frictional surface therein for engaging the outer surface of the tube or plug. A primary O-ring seal is disposed axially inboard of the collet and around the insertion portion of the tube support. The primary O-ring seal has an inner diameter larger than the outer diameter of the tube insertion portion of the tube support for sealing against the outside portion of the tube. A secondary O-ring seal is disposed between the coupling and the circular bore within the body and has an inner diameter larger than the inner diameter of the primary O-ring seal and an outer diameter larger than that of the sleeve when the secondary O-ring seal is undeformed.

In accordance with one aspect of the invention, the insertion portion of the tube support is polygonal in cross-section to facilitate insertion of the tube.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
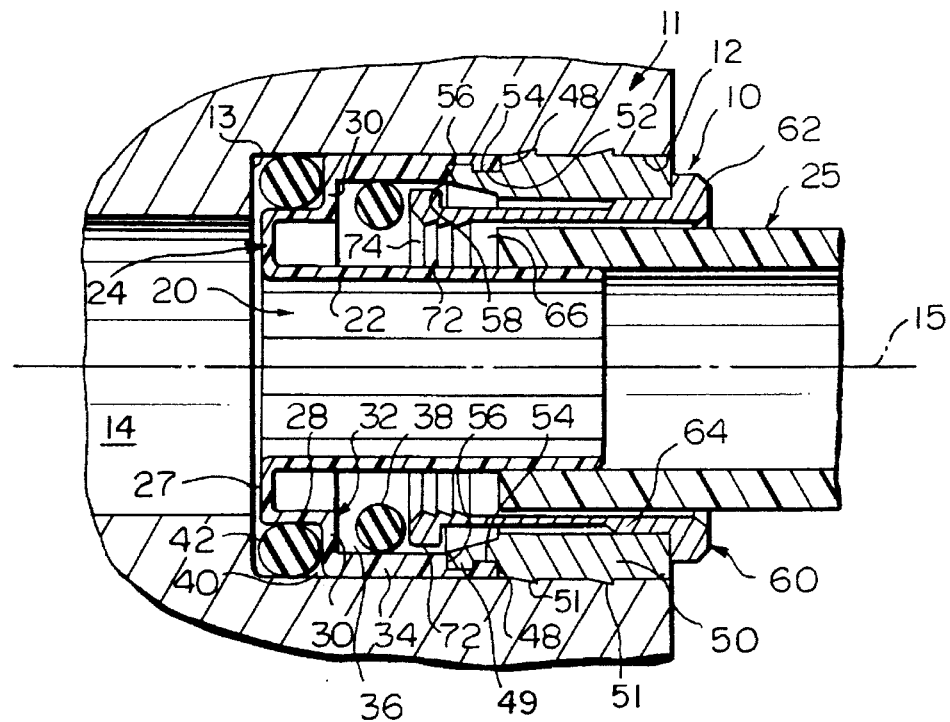
FIG. 1 is a partial cross-sectional view illustrating a push-to-connect coupling configured in accordance with the present invention with a leading end of a tube partially inserted therein.

FIGS. 1–4 illustrate a quick connect coupling 10 mounted in a body 11 which body may be a conventional fitting, a valve, a manifold or a similar device. The body 11 has an unstepped bore 12 formed therein which has an annular bottom 13 which is coaxial with a circular passage 14 about an axis 15. The body 11 may be formed of a metallic material, as illustrated, such as brass or aluminum or may be formed of a plastic material such as reinforced nylon.

The coupling 10 includes a relatively rigid tube support and O-ring gland 20 made of plastic which has an inner axially extending, tubular, tube support portion 22 and a radially extending base portion 24. The tubular tube support portion 22 is illustrated as being polygonal, specifically decagonal, as is seen in FIG. 4, but alternatively may be circular in cross-section. The tube support portion 22 has an outer diameter substantially equal to or complementary to the inner diameter of the tube 25 (FIGS. 1 and 2) or plug 26 (FIG. 3) inserted thereover so as to provide a friction fit therewith.

The radially extending base portion 24 of the tube support and O-ring gland 20 forms a base for supporting other elements of the assembly which comprises the coupling 10. The radially extending base portion 24 is unitary with the tubular tube insertion portion 22 and includes a first radial flange 27 extending directly from the insertion portion 22, a first axial portion 28, and a second radial portion 30. The first axial and second radial portions 28 and 30, respectively, provide a step 32 from which extends a second axial portion 34.

The step 32 defines an interior space 36 in which is disposed a primary O-ring seal 38 and an exterior space 40 in which is disposed a secondary O-ring seal 42. The primary O-ring seal 38 has an inner diameter larger than the outer diameter of the tubular tube insertion portion 22 of the tube support 20 and is deformed upon insertion of the tube 25 or plug 26 to seal against the outside surface of the tube or plug 26. The secondary O-ring seal 42 has an inner diameter larger than the inner diameter of the primary O-ring seal 38 and an outer diameter larger than the unstepped bore 12 when the secondary O-ring seal is undeformed. The secondary O-ring seal 42 deforms to seal between the coupling 10 and the axially extending wall of the unstepped bore 12.

Disposed in engagement with the end 48 of the second axial portion 34 is an inner end 49 of a brass sleeve 50 which, in the illustrated embodiment, has an outer end flush with the face of the body 11. The brass sleeve 50 has barbs 51 which engage the wall of bore 12 in the body 11 and includes four indentations 52 therein (see FIG. 4) proximate the inner end 49 which provide groove means which receive detents 54 projecting inwardly from the second axial end portion 34 of the tube support and O-ring gland 20. A shoulder 56 on the second axial portion 34 abuts the inner end 49 on the sleeve 50 in order to axially position the sleeve with respect to the tube support and O-ring gland 20. The detents 54 form a first latching structure which couples with the indentations 52 which form a second latching structure. The latching arrangement provided by the interfacing structure of the indentations 52, detents 54 and abutting surfaces 48, 56 and 58 allow the tube support and O-ring 20 to be coupled directly to the sleeve 50 for shipping.

Disposed within the sleeve 50 is a collet 60 made of metal which has a radial rim portion 62 with a diameter larger than the inner diameter of the brass sleeve 50 and a collet insertion portion 64 which is received within the brass sleeve. The insertion portion 64 has an outer diameter less than the inner diameter of the sleeve 50 and an inner diameter greater than the outer diameter of the insertion portion 22 of the tube support and O-ring gland 20 to define a space 66 therebetween for receiving the tube 25 or plug 26. The collet 60 has an inner end 70 with an inner rim 72 that axially faces the primary O-ring seal 38. Proximate the inner end 72 are a series of annular teeth 74 which provide a tube gripping portion in the collet 60.

Figure 2:
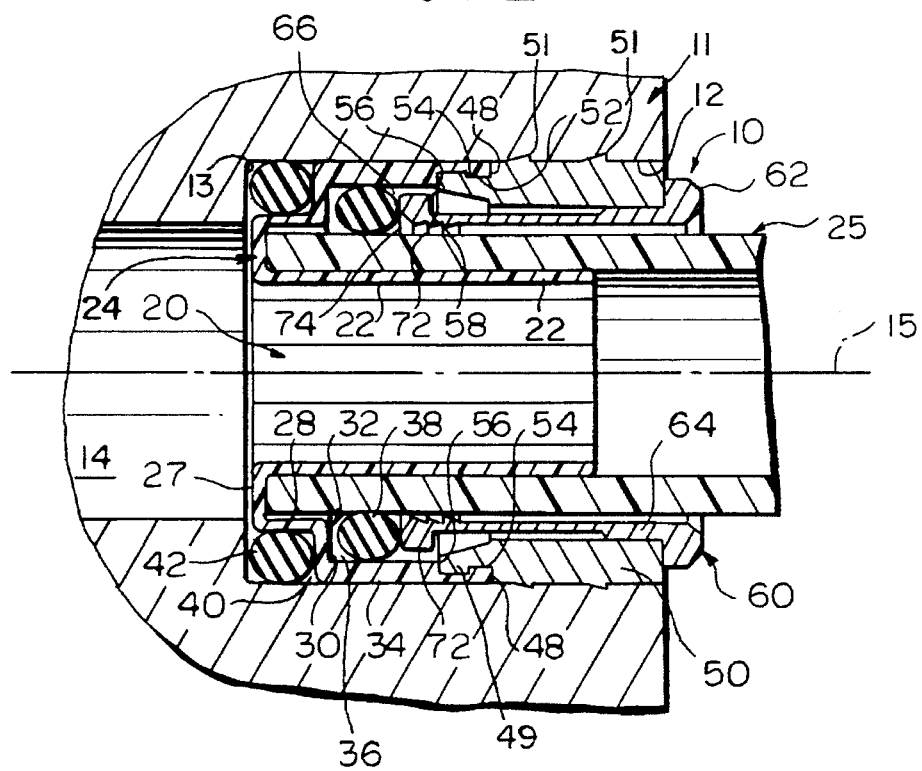
FIG. 2 is a view similar to FIG. 1 but showing the tube completely inserted within the coupling.

In operation, the tube 25 is pushed over the tube insertion portion 22 of the tube support and O-ring gland 20 and into the collet 60. As is seen in FIG. 2, the tube 25 is pushed all the way home to engage the radial flange 27 on the radial portion base 24 of the tube support and O-ring support. When the tube 25 is seated in the tube support 20, the teeth 74 of the collet 60 engage the outer surface of the tube so that the tube cannot be extracted from the coupling 10 without first axially displacing the collet 60. The primary O-ring seal 38 engages the exterior surface of the tube 25 and deforms to ensure a sealing arrangement with the tube support 20 while the secondary O-ring seal 42 is deformed slightly and seals with the axial wall and perhaps base 13 of the unstepped circular bore 12 in the body 11.

Referring now to FIG. 4, the insertion portion 22 of the tube support and O-ring gland 20 is preferably polygonal in cross-section so as to reduce friction between the insertion portion and the inner wall of the tube. The ten corners 81 of the polygon are rounded to reduce tube insertion forces which is a particularly useful configuration for larger size tubes 25 which tend to be more oval in a relaxed state. Since friction is reduced, it is much easier to slide the tube 25 over the decagonal insertion portion 22 of the tube support and O-ring gland 20. Alternatively, the insertion portion 22 can be circular. In the embodiment of FIGS. 1–4, the entire tube support and O-ring gland 20 is molded of plastic.

Figure 3:
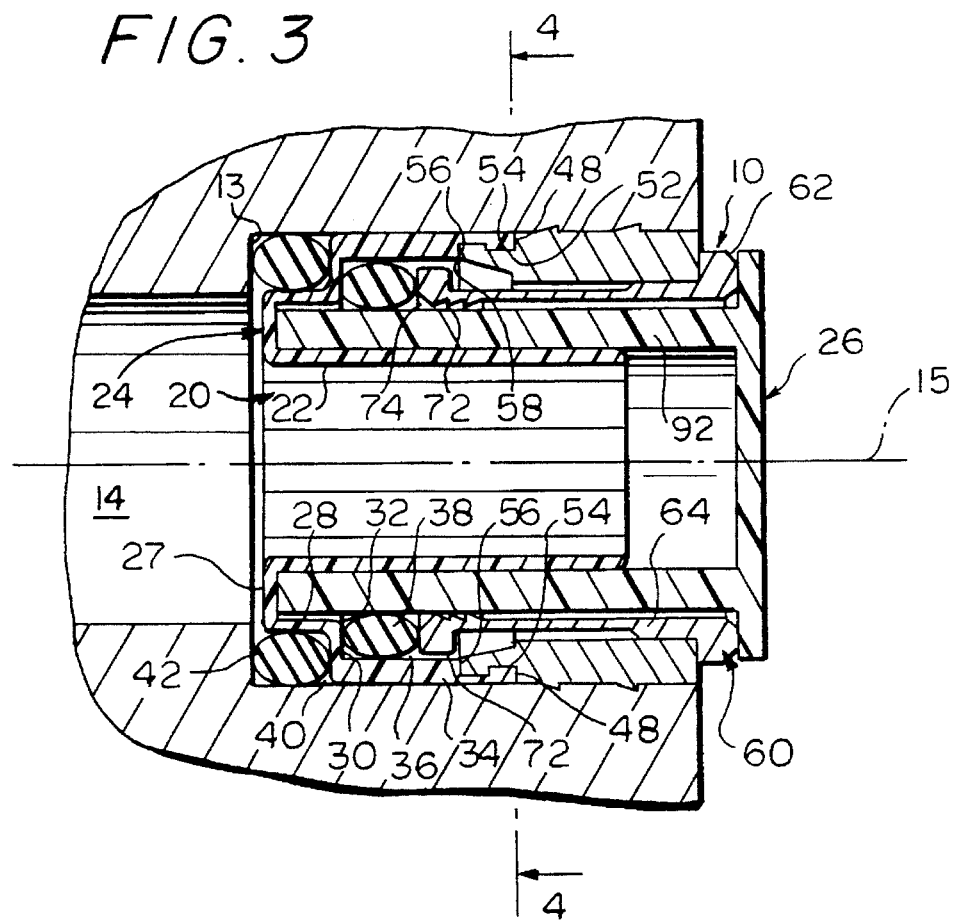
FIG. 3 is a view similar to FIG. 2 but showing a plug inserted into the coupling.
Figure 4:
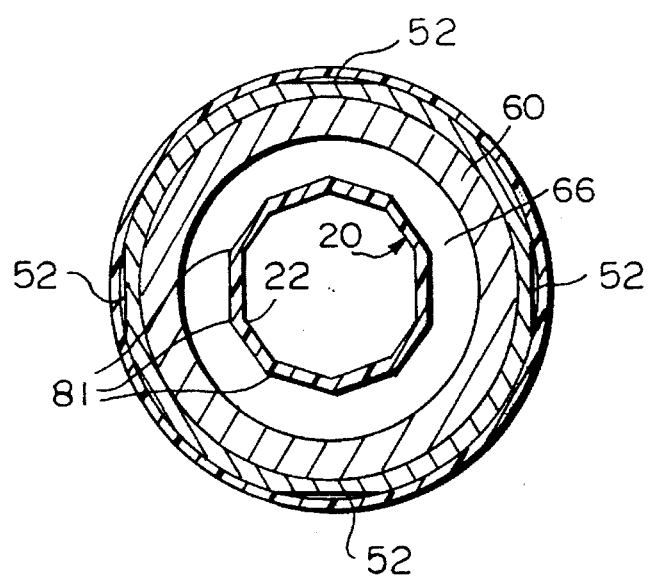
FIG. 4 is an elevation taken along lines 4–4 of FIG. 3.

In FIG. 3, the plastic plug 26 is inserted into the quick connect coupling 10. The plug 26 can be used for a number of purposes such as permanent closure of the passage 14 aligned with a bore 12, for test purposes or for retaining the collet 60 during shipping. The plug 26 is configured with a tubular shank 92 dimensioned with inner and outer diameters similar to the tube 25 and is connected and disconnected from the coupling 10 in the same way as the tube.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a quick-connect coupling, useful to connect tubes or plugs within unstepped bores formed in bodies in alignment with fluid passages, wherein the coupling includes a plastic tubular tube support of an outside diameter suitable for frictionally engaging the inner wall of the tube or plug; a metal sleeve having an inner diameter greater than the outer diameter of the tube or plug and an outer diameter which is substantially the same as the diameter of the unstepped bore for frictionally retaining the sleeve in the bore; a collet having an outer diameter complementing the inner diameter of the sleeve and an inner diameter greater than the outer diameter of the tubular tube support and slightly less than the outer diameter of the tube or plug, wherein the tube or plug is frictionally retained between the collet and tubular tube support, and at least one O-ring seal is disposed around the coupling, the improvement comprising:

the tubular tube being made of plastic;

a base support portion extending radially from the plastic tubular tube support, the base having an axially extending portion with an end facing the sleeve;

a first latching structure at the end of the axially extending portion, of the plastic tubular tube support; the first latching structure having a plurality of inwardly facing detents; and inner and outer ends on the metal sleeve with a second latching structure at the inner end of the metal sleeve, the second latching structure having groove means receiving the detents; the latching structures coupling to positively retain the sleeve on the tubular tube support upon the detents being received in the groove means.

2. The improvement of claim 1, wherein a step is provided in the base of the tubular tube portion at the axially extending portion to define an interior and an exterior space and wherein a primary O-ring is disposed in the interior space to seal against the tube or plug and secondary O-ring is disposed in the exterior space to seal with the bore.

3. The improvement of claim 2, wherein the collet has inner and outer ends with the inner end being aligned with and facing the primary seal and the outer end having a flange disposed over the outer end of the sleeve.

4. The improvement of claim 3, wherein the collet has an inner surface adjacent the inner end thereof with teeth therein for engaging the exterior surface of the tube or plug.

5. The improvement of claim 1, wherein the collet is made of metal.

6. The improvement of claim 1, wherein the tubular tube support has a polygonal cross-section which is received within the tube or plug.

7. In a quick-connect coupling, useful to connect tubes or plugs within unstepped bores formed in bodies in alignment with fluid passages, wherein the coupling includes a tubular tube support of an outside diameter suitable for frictionally engaging the inner wall of the tube or plug; a sleeve having an inner diameter greater than the outer diameter of the tube or plug and an outer diameter which is substantially the same as the diameter of the unstepped bore for frictionally retaining the sleeve in the bore; a collet having an outer diameter complementing the inner diameter of the sleeve and an inner diameter greater than the outer diameter of the tubular tube support and slightly less than the outer diameter of the tube or plug, wherein the tube or plug is frictionally retained between the collet and tubular tube support, and at least one O-ring seal disposed around the coupling, the improvement comprising:

the tubular tube support having a polygonal cross-section;

a base support portion extending radially from the tubular tube support, the base having an axially extending portion with an end facing the sleeve;

a first latching structure at the end of the axially extending portion of the tubular tube support; and inner and outer ends on the sleeve with a second latching structure at the inner end of the sleeve, the latching structures coupling to positively retain the sleeve on the tubular tube support.

8. A quick-connect coupling for connecting tubes within unstepped bores formed in bodies in alignment with fluid passages, wherein the coupling includes a tubular tube support of an outside diameter suitable for frictionally engaging the inner wall of the tube or plug; the tubular tube support having a polygonal cross-section in order to reduce friction between the outside of the tubular tube support and the inside of the tube; a sleeve having an inner diameter greater than the outer diameter of the tube or plug and an outer diameter which is substantially the same as the diameter of the unstepped bore for frictionally retaining the sleeve in the bore; a collet having an outer diameter complementing the inner diameter of the sleeve and an inner diameter greater than the outer diameter of the tubular tube support and slightly less than the outer diameter of the tube or plug, wherein the tube is frictionally retained between the collet and tubular tube support, and at least one O-ring seal disposed around the coupling for sealing the coupling with the bore.

\* \* \* \* \*